Oct. 7, 1930.  H. H. FRANKS  1,777,432

WRIST PIN PULLER

Filed Nov. 18, 1929

INVENTOR
Harry H. Franks
BY
ATTORNEY

Patented Oct. 7, 1930

1,777,432

UNITED STATES PATENT OFFICE

HARRY H. FRANKS, OF TULSA, OKLAHOMA, ASSIGNOR OF THREE-FOURTHS TO TIDAL OIL COMPANY, OF TULSA, OKLAHOMA, A CORPORATION OF OKLAHOMA

WRIST-PIN PULLER

Application filed November 18, 1929. Serial No. 407,977.

My invention relates to wrist pin pullers, and more particularly to a device of that character for removing the wrist pin from the band wheel crank of a well drilling and pumping rig.

In rigs of this character, including a walking beam operable from a crank shaft, the beam is connected with a crank arm on the shaft by a pitman and wrist pin, the wrist pin being adapted for adjustment on the crank arm to adjust the stroke of the beam; the adjustment being effected by selective location of the pin in a series of spaced openings in the crank arm, and as the pin must have a close, tight fit in the arm to avoid lost motion and the resultant tendency to shearing or displacement of the pin, it is frequently difficult to remove the pin for replacement or readjustment.

It is the object of my invention to provide a device for removing the pin without damage to the pin or its carrying arm.

In accomplishing this object, I have provided improved details of structure, the preferred form of which is illustrated in the accompanying drawings, wherein.

Figure 1:
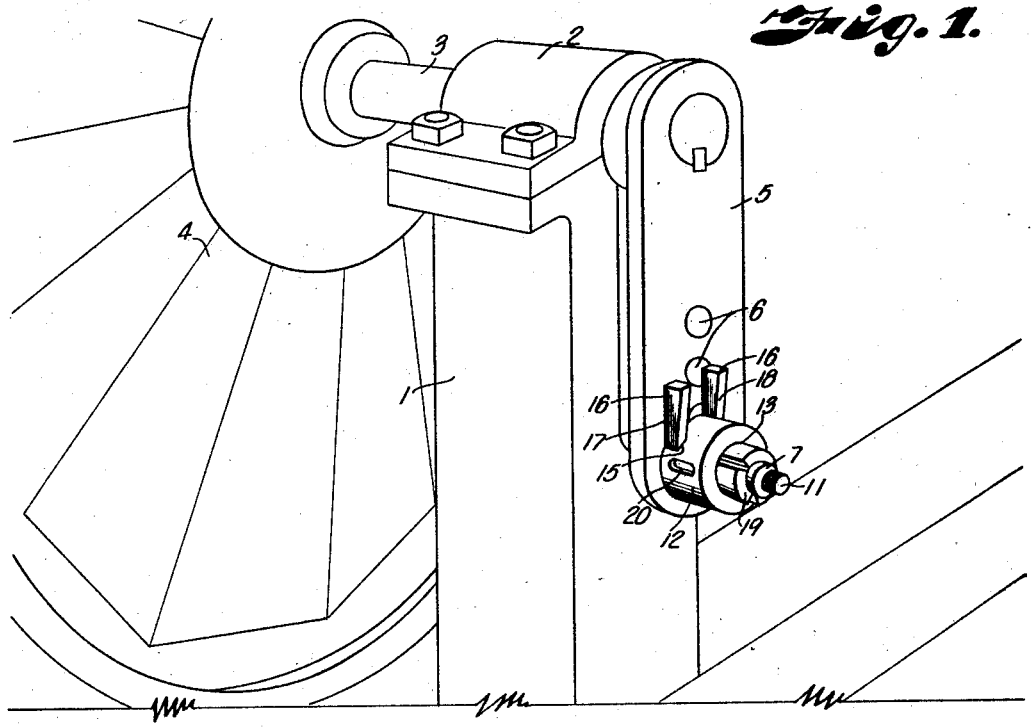
Fig. 1 is a perspective view of a wrist pin puller embodying my invention, applied to a band wheel crank arm of the type commonly employed in well drilling and pumping rigs.
Figure 2:
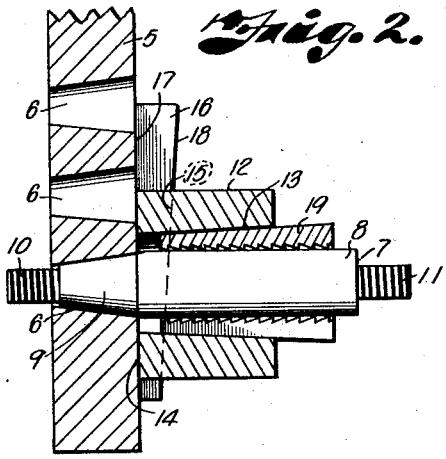
Fig. 2 is an enlarged central section of the puller, illustrating its application to a wrist pin and crank arm.
Figure 3:
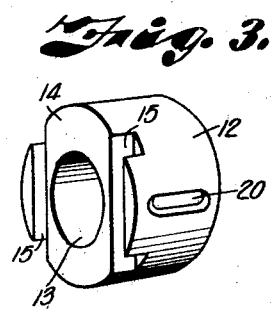
Fig. 3 is a detail perspective view of the puller collar.

Referring more in detail to the drawings:

1 designates the jack post with its bearing 2 for the shaft 3 of the band wheel 4, and 5 the usual crank arm keyed to the shaft 3 and provided with a plurality of radially spaced openings 6 for a wrist pin 7 including a cylindrical body portion 8 for carrying a pitman bearing (not shown), a tapered end shank 9 for fitting within the tapered openings 6 of the crank arm 5, and the usual threaded ends 10 and 11 for carrying locking nuts (not shown).

12 designates a collar having a central tapered bore 13 of substantially greater diameter than the body of the wrist pin, a flat inner end 14 at the smaller end of the bore 13 for bearing flush against the outer face of the crank arm, and tapered slots 15 in the inner end of the collar adapted for receiving wedge members 16, each having a flat edge 17 adapted to bear flush against the flat face of the crank arm 5, and a tapered edge 18 matching the taper of the slots 15.

19 designates slips having outer faces curved on the axes of the pin 8 and sleeve bore 13, tapered on their outer faces reversely to the taper of the sleeve bore, and wickered on their inner faces to provide locking contact with the wrist pin under the conditions presently described.

The collar 12 is also preferably provided in its outer face with spanner wrench sockets 20 for a purpose presently mentioned.

If, during operation of the pumping rig, it should become necessary to replace or readjust the pin and the pin should stick in the opening of the crank arm, the collar 12 is slipped over the pin until its inner end abuts against the face of the crank arm. The slips are then slipped over the pin and into the tapered bore of the collar until a firm contact is established between the slips, the collar and the body of the wrist pin. The wedge members are then projected into the slots in the end of the collar with the flat edges bearing against the face of the crank arm. With the parts so arranged, the wedges are driven into the slots, thereby forcing the collar away from the crank arm, causing the collar to grip the pin through the slips and forcing the pin outwardly with the collar, thereby pulling the tapered shank of the pin from the crank arm opening.

When the pin has been removed the collar is driven off of the slips to disassemble the puller from the wrist pin so that it may be reassembled in a new location on the crank arm or replaced with another pin.

Should the pin stick to the arm with extraordinary firmness, a spanner wrench may be applied to the collar by means of the sockets 20 to impart a rotary jar to the pin for assistance in loosening it from the crank arm.

It is apparent that with my device a stuck pin may be removed without damage to the pin and with greater ease than by the ordinary methods of removal.

What I claim and desire to secure by Letters Patent is:

1. A wrist pin puller including a collar having a tapered bore and transverse end slots at opposite sides of the bore, slips adapted to fit in the collar bore about a wrist pin, and wedges adapted for movement in said slots and against a pin-carrying body to set the slips against the pin and effect movement of the pin with the collar in response to movement of the wedges.

2. A wrist pin puller including a collar having a tapered bore and tapered slots in the end of the collar containing the smaller end of the bore, slips for the collar, and wedges for the slots, each tapered on one edge to match the taper of said slots.

3. A wrist pin puller including a collar having a tapered bore and tapered slots in the end of the collar containing the smaller end of the bore, slips for the collar, and wedges for the slots, each tapered on one edge to match the taper of said slots and flat at the opposite edge to lie flush against the plane surface of a pin-carrying body.

4. A wrist pin puller including a collar having a tapered bore, transverse end slots at opposite sides of the bore and wrench sockets in its outer face, slips adapted to fit in the collar bore about a wrist pin, and wedges adapted for movement in said slots and against a pin-carrying body to set the slips against the pin and effect movement of the pin with the collar in response to movement of the wedges.

In testimony whereof I affix my signature.

HARRY H. FRANKS.